United States Patent
Schipper et al.

(10) Patent No.: US 7,577,253 B2
(45) Date of Patent: Aug. 18, 2009

(54) CONDITIONAL ACCESS METHOD AND DEVICES

(75) Inventors: Robert Schipper, Eindhoven (NL); Erwin Jeroen Van Dommelen, Veldhoven (NL)

(73) Assignee: Irdeto Eindhoven B.V. (NL)

(*) Notice: Subject to any disclaimer, the term of this patent is extended or adjusted under 35 U.S.C. 154(b) by 426 days.

(21) Appl. No.: 10/578,647

(22) PCT Filed: Nov. 4, 2004

(86) PCT No.: PCT/IB2004/052300
§ 371 (c)(1),
(2), (4) Date: May 9, 2006

(87) PCT Pub. No.: WO2005/048603
PCT Pub. Date: May 26, 2005

(65) Prior Publication Data
US 2007/0133797 A1    Jun. 14, 2007

(30) Foreign Application Priority Data
Nov. 13, 2003   (EP) ................... 03104172

(51) Int. Cl.
*H04N 7/167* (2006.01)
*H04L 9/00* (2006.01)
*G06F 7/04* (2006.01)

(52) U.S. Cl. .............. 380/231; 713/189; 713/190; 713/191; 713/193; 713/194; 726/27; 726/28; 726/29; 726/30

(58) Field of Classification Search .............. 380/231
See application file for complete search history.

(56) References Cited

U.S. PATENT DOCUMENTS

| 5,799,081 A | 8/1998 | Kim et al. |
| 6,584,199 B1* | 6/2003 | Kim et al. ............... 380/203 |
| 2005/0033964 A1* | 2/2005 | Albanese et al. ........... 713/171 |

FOREIGN PATENT DOCUMENTS

WO   WO-2003/056823 A1   7/2003

OTHER PUBLICATIONS

"Functional model of a conditional access system", *EBU Project Group B/CA, EBU Technical Review*, (Dec. 31, 1995), 68-75.

* cited by examiner

*Primary Examiner*—Longbit Chai
(74) *Attorney, Agent, or Firm*—Schwegman, Lundberg & Woessner, P.A.

(57) ABSTRACT

A data stream contains content data that can be decrypted using control words. ECM messages that are included in the stream and contain the control words that is required for decrypting nearby content data. EMM messages contain management information for entitling selected stream receiving devices to decrypt content data from the data stream using control words from ECM messages. Further management information is included in at least some of the ECM messages. The secure device detects The further management information when the control words are supplied and tests whether the further management information is targeted at the stream receiving device (12). If so the secure device indefinitely disables subsequent decryption of at least part of the stream in the stream receiving device (12). In one embodiment, the further management information is targeted by means of a specified condition on entitlement information stored in the secure device. The secure device tests whether any of its entitlement information meets this condition and, if so, disables supply of valid control words.

10 Claims, 2 Drawing Sheets

CONDITIONAL ACCESS METHOD AND DEVICES

U.S. Pat. No. 5,799,081 describes a use of an encrypted data stream. This patent discusses an MPEG transport stream that provides for conditional access to data. MPEG conditional access is managed by two types of messages: Entitlement control messages (ECM) and Entitlement management messages EMM's. A secure device (e.g. smart card) in a stream receiver receives both ECM's and EMM's. The ECM's and EMM's provide the broadcaster of an MPEG transport stream control over whether individual stream receivers can access the stream.

The ECM's contain control words (keys CW) for use by all entitled stream receivers to decrypt data such as video data. The necessary control words CW are changed regularly, for example every 10 seconds, and ECM's are provided at an even higher frequency, for example every tenth of a second. Typically, the secure device decrypts the control words CW from the ECM's and supplies these control words to a decoder that uses the control words to decrypt data such as video data.

The EMM's are used to control which stream receivers are entitled to decrypt data. The EMM's are directed at individual stream receivers and are used to instruct the secure device of a stream receiver whether it should make the control words CW available for decrypting data. This may involve providing the necessary keys for decrypting ECM's and/or other instructions about entitlement. Typically the transmission of EMM's is dependent on payment of a subscriber fee for a particular stream receiver.

U.S. Pat. No. 5,799,081 describes how copy control information can be included in the ECM's. Thus the ECM's are used in a recording system to prevent that too many copies are made of an MPEG transport stream.

The possibility to tamper with EMM's forms a weak point of this type of conditional access stream. If an EMM contains an instruction to disable decryption at a stream receiver, a hacker can prevent disabling by blocking transfer of the EMM to the secure device. Similarly, by supplying a falsified EMM, or a copy of an old, enabling EMM entitlement can be tampered with. Of course, various precautions can be taken against this, but these measures are not always watertight. Moreover, such measures may require additions to the secure device, such as a time of day/calendar counter that are not always compatible with smart cards.

Among others, it is an object of the invention to provide measures that control conditional access to an encrypted data stream in a way that make it more difficult to get access to the stream by tampering.

According to the invention management information for disabling decryption in selected stream receivers is included in messages, such as ECM's, that supply control words for decrypting data. Thus, at least some ECM's are made "poisonous" for selected stream receivers. The idea behind this is that hackers on one hand need to supply ECM's to the secure device to profit from the stream and on the other hand cannot determine beforehand which ECM's are poisonous for their secure device.

Accordingly a device for generating a stream is provided that adds "poison" information directed at selected stream receivers to messages with control words for decrypting the stream. A secure device is provided that uses messages with control words to supply control words from the messages, but also detects whether these messages contain "poison" information directed at the secure device and, if so, such a secure device indefinitely disables supply of control words. (By indefinitely is meant not for a predetermined normal period, such as a subscription period or the period of validity of a control word). Disabling may be performed in a similar way as for EMM processing, but preferably special forms of disabling are available for disabling in response to EMM's, such as completely and permanently disabling the secure device, or disabling all programs from a specific supplier until further notice, removing or disabling keys needed for decryption etc.

The poisonous ECM's are targeted at selected secure devices for example by specifying a condition in the ECM that must be met by entitlement information that is stored in a secure device. In response to the ECM the secure device disables decryption if it detects any entitlement information that meets the condition. Thus, a system manager can cause all secure devices to start searching for the presence of falsified entitlement information that has not been supplied normally.

These and other objects and advantages of the invention will be described in a non-limitative way using the following figures.

Figure 3:
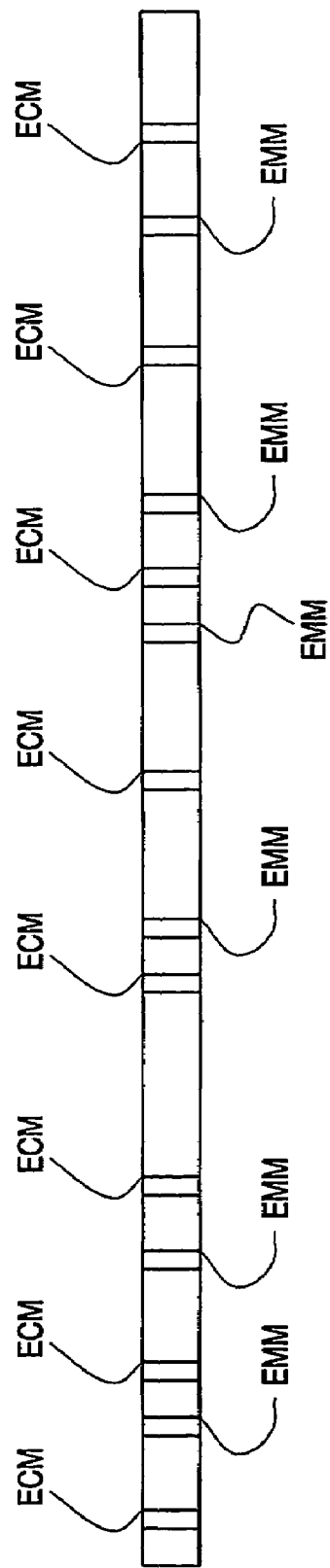

FIG. 3 symbolically shows a stream.

Figure 1:
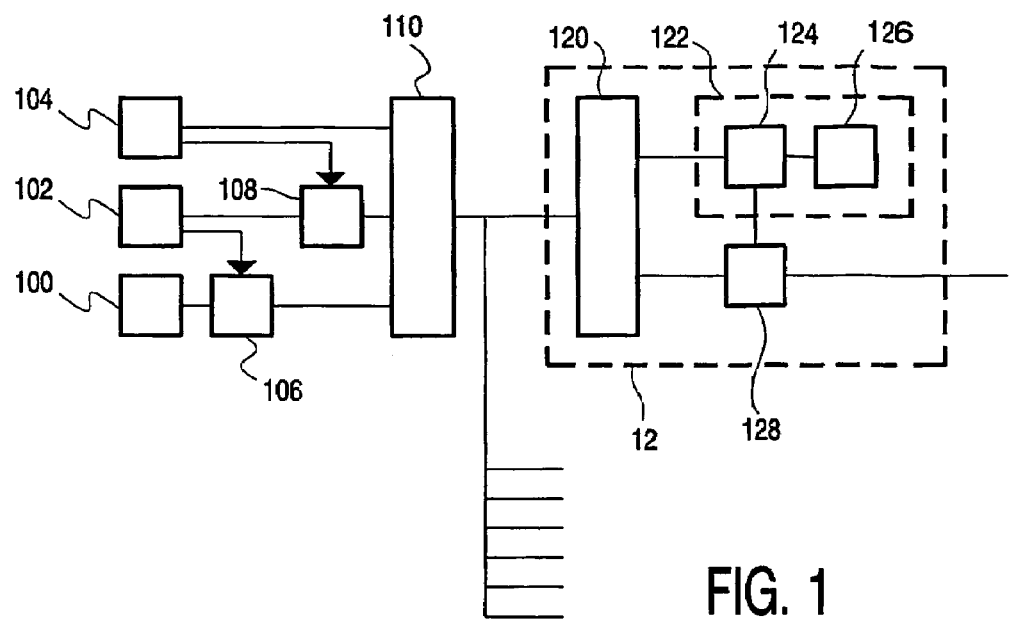
FIG. 1 shows a conditional access system

FIG. 1 shows a conditional access system. The system comprises a transmitter/multiplexer 110, which receives inputs from a data source 100 via a data encryption unit 106, from a control word source 102 via an ECM generator 108 and from a source of management information 104. Control word source 102 supplies encryption control words to data encryption unit 106. Source of management information 104 supplies management information to ECM generator 108.

Furthermore, the system comprises a plurality of stream receivers 12 (only one shown explicitly). Each receiver comprises a demultiplexer 120 with outputs coupled to a secure device 122 and a decoder 128. In the secure device measures (known per se) have been taken against tampering. The secure device is typically a smart card. The secure device 122 is shown to contain a processor 124 and a memory 126. Processor 124 has an output coupled to decoder 128 and decoder 128 has an output coupled to an output of stream receiver 12.

In operation transmitter/multiplexer 110 receives and multiplexes encrypted content data, ECMs and EMMs and transmits the resulting stream to a plurality of stream receivers 12. The stream receivers demultiplex the stream, and decrypt the content data if the secure device 122 so permits.

FIG. 3 symbolically shows a stream made of messages, including ECM's and EMM's interspersed between content data.

Data source 100 produces content data, such as audio and/or video data, which is encrypted by data encryption unit 106 for transmission by transmitter/multiplexer 110. Decoder 128 receives the encrypted content data and if it receives the appropriate control words from secure device 122 it decrypts the content data and supplies the decrypted content data at its output.

Source of management information 104 generates EMM's with instructions for secure devices in individual stream receivers 12 or groups of stream receivers 12. Demultiplexer 120 demultiplexes the transmitted EMM's from the stream and supplies them to secure device 122. Processor 124 of secure device 122 detects whether the EMM is directed at the particular secure device 122 and, if so, executes the instruction that is implied by the EMM, for example by updating entitlement information and/or keys in memory 126. Entitlement information indicates for example information to identify programs from the stream that stream receiver 12 is entitled to decrypt, and/or the time and date at which stream receiver 12 is entitled to decrypt etc. Typically the entitlement information for a particular stream receiver 12 depends on whether or not the user of the stream receiver 12 has acquired a subscription for a particular service and/or has paid subscription fees.

Control word source 102 generates control words for encrypting the data from data source and corresponding control words for decrypting the encrypted data. Typically the control words are changed every few seconds, e.g. every ten seconds. Data encryption unit 106 uses the encryption control words to encrypt the content data and ECM generator 108 includes the control words for decryption in ECM messages, which are transmitted contemporaneously with, or slightly before the content data that can be encrypted with the control words. Demultiplexer 120 demultiplexes the transmitted ECM's from the stream and supplies them to secure device 122. Processor 124 of secure device 122 tests whether information in memory 126 indicates that the secure device is entitled to permit decryption with the control word from the ECM and, if so, processor 124 extracts the control word from the ECM (typically by decrypting the ECM) and supplies the control word to decoder 128.

According to the invention source of management information 104 also supplies management information to ECM generator 108 and ECM generator 108 includes this information in the ECM's (however, without deviating from the invention the management information may also be supplied externally). Typically, this is "poison" information, instructing selected secure devices 122 to disable decryption of content information. Processor 124 in secure device 122 is programmed to inspect received ECM's to detect whether it contains such poison information directed at the particular secure device 122. If so, processor 124 updates the entitlement information in memory 126 so as to disable supply of control words to decoder 128, at least for an identified period or program from the stream, but preferably for all programs, or for all programs from a selected program provider. In this embodiment processor 124 gives effect to the information from the ECM much like it gives effect to information from EMM's. In another embodiment processor 124 is arranged to disable secure device 122 in a more irreversible way, for example by blowing a fuse that enables operation.

The management information supplied to ECM generator 108 and included in the ECM's may also be conditional, e.g. in the form of a command to secure devices 122 to disable decryption if certain data in its memory (e.g. among the entitlement data) meets a condition specified in the command. In response to the command, secure device 122 searches its memory to detect whether there is data that meets the condition, and if so executes the disable operation. The condition may for example test for entitlements of a type that have not been issued in the EMM's, having for example aberrant periods of validity. Also, the condition may test for a type of entitlement that is needed to decrypt a stream that has been transmitted (or is being transmitted), but for which no entitlements have been transmitted in EMM's for at least for a group of users. The secured device of hackers who have constructed entitlement information for this stream are thus detected. In addition to the condition one may include an identification of a secure device or a group of secure devices for which the command is intended. Instead of conditional disabling, conditional enabling (e.g. for a specified period) may also be used.

Figure 2:
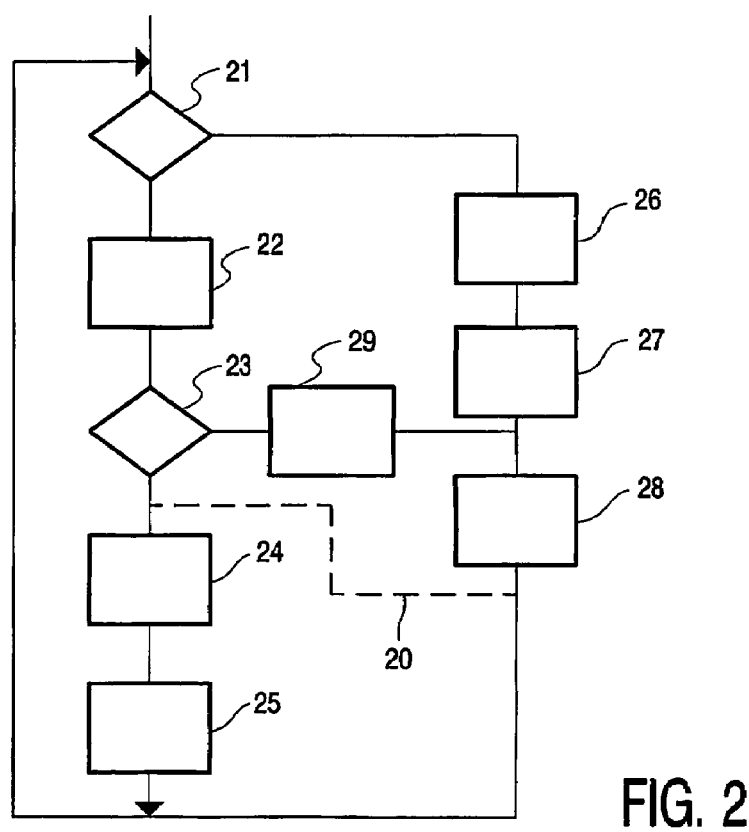
FIG. 2 shows a flow chart of the operation of a secure device

FIG. 2 shows a flow chart of the operation of processor 124. In a first step 21 processor 124 receives a message and tests whether this message is an ECM or an EMM. The test may also be performed before the message is supplied to processor 124, using for example a identification information from the stream. In this case selectively only ECM or EMM's may be supplied to processor, optionally with additional information to distinguish ECM and EMM's. If the message is an ECM processor 124 executes a second step 22, decrypting the ECM, optionally checking whether the syntax of the ECM is correct and optionally verifying whether the ECM is authorized (such a check is known per se). In a third step processor 124 tests whether the decrypted ECM contains poison information addressed at the secure device to which the processor belongs, e.g. by comparing an address ID value in the ECM with an ID code in the secure device 122. If there is no poison information for the secure device, processor 124 executes a fourth step 24, to extract one or more control words from the ECM. In a fifth step 25 processor 124 supplies the control word or words to decoder 128. Subsequently the process returns to first step 21.

When in first step 21 processor 124 detects an EMM, processor 124 proceeds with a sixth step 26, decrypting the EMM if necessary and optionally authenticating the EMM; decryption and authentication are known per se (it will be noted that different decryption keys are generally used for decrypting ECM's and EMM's, the decryption key for decrypting ECM's being common to all secure devices that have access to a stream). Subsequently, in a seventh step 27 processor 124 extracts management information from the decrypted EMM. In an eight step 28 processor 124 uses this management information to update entitlement information or keys in memory 126. Subsequently the process returns to first step 21.

When in third step 23 processor 124 detects that the ECM contains poison information for the secure device, processor 124 executes steps to give effect to the poison information. In one embodiment these may be the same steps as those used for effecting EMM's, in order to modify entitlements, but preferably dedicated steps are used, which alter the functioning of the secure device in a way that cannot be undone by any EMM. Thus hackers that are able to falsify EMM's cannot prevent countermeasures.

In the embodiment wherein the steps of EMM processing are used processor 124 executes a ninth step 29 and proceeds to eight step 28, now using management information from the ECM (instead of information from an EMM) to update entitlement information in memory 126, or to disable supply of control words for certain programs or all programs altogether until further notice.

Optionally, in this case when the entitlement information comes from an ECM, processor 124 may proceed to fourth step 24 after eight step 28, as shown by dashed. line 20. Thus, it is not immediately visible to a user that the ECM did contain poison information. This makes it more difficult for hackers to screen ECM's for ECM's with poison information.

Although, as shown, program steps that are used for EMM's may be reused for entering information received from ECM's as well, one may of course use steps dedicated to entering management information from ECM's (for example by providing dedicated computer programs to processor to do so). Thus, it is possible to execute functions that are not available for EMM's. Processor 124 may for example be arranged to entering additional control data (not conventional entitlements) into memory for blocking decryption. During processing of subsequent ECM's processor 124 may each time test this additional control data to determine whether control words from the ECM's may be supplied for decrypting a program in the stream, or for any program in the stream, or for a group of programs from the same program supplier.

It is also possible to add a function to disable the secure device altogether in response to a command from an ECM, or to overwrite or disable certain keys that are needed in the secure device for supplying control words. Similarly, a countdown value may be entered, processor 124 counting ECM's until a number of ECM's corresponding to countdown value has been counted, after which effect is given to the poison information.

Processor 124 may use various methods to decide whether an ECM is targeted at the secure device of which processor 124 is part In one example, the management information contains an identification of the secure device for which the poison information is intended. In this case, processor 124 compares this identification with an identification that is stored in the secure device and gives effect to the poison information (disabling supply of control words) only if the identification matches.

In another example the ECM contains a conditional command, specifying an entitlement, or properties of an entitlement that must be present. If processor 124 detects such a command in an ECM, it searches memory 126 for an entitlement that meets the condition. Only if processor 124 finds such an entitlement processor 124 gives effect to the poison information (disabling supply of control words).

Typically, a system manager decides to distribute poison information in cases where the manager fears that specific secure devices may be used for tampering. For example to disable a secure device when no subscription is extant any longer for that secure device, or to specifically disable decryption of certain programs that the subscriber has not validly subscribed to. This type of poison information is preferably included in ECM's at random, so that it cannot be predicted when an ECM will contain poison information for a specific secure device. For this purpose source of management information 104 preferably contains a random generator to decide when and in which ECM's to include poison information for a selected secure device 122 that has to receive such information.

As another example, if the system manager finds out that hackers have succeeded in falsely creating a certain type of entitlement information, the system manager can decide to start broadcasting ECM's command with a condition that causes the secure devices to tests for entitlement information of this type and to disable decryption if this type of entitlement is detected (provided of course that untampered secure devices do not, or do no longer, contain such entitlements). A system manager could also intentionally broadcast a program for which no entitlements are supplied at all. If hackers, in an excess of enthusiasm, create entitlements for this program, supply of a command to disable secure devices for all programs that if they contain such entitlements can be used as a countermeasure against hacking.

Although the invention has been described in terms of ECM's, it will be appreciated that the poison information may be included in any message that contains information (control words) that is vital to decrypting content data. It will be appreciated that not all such ECM-like messages need to include such poison information. Indeed different ECM's may contain poison information for different secured devices. However, since normal management information is supplied using EMM's relatively many ECM's may contain poison information directed at specific secure devices. From transmitted ECM's it is not possible to see whether they contain poison information directed at a specific device, for example because all ECM's have the same length and are encrypted. Thus a hacker permanently risks that his or her secure device will be disable when decrypting content data.

Although the invention has been described for "poison data", i.e. data aimed at disabling entitlements in a selected secure device, it will be understood that the invention can be applied to other updates of entitlement information that should not be blocked.

The invention claimed is:

1. A method of providing conditional access to an encrypted data stream, the method comprising:
   receiving encrypted content data at a stream receiving device, the decryption of which requires temporally changing control words (CW), in a data stream;
   receiving first decryption control messages (ECM's) in the data stream, each first decryption control message (ECM) containing at least one of the control words that is required for decrypting the encrypted content data;
   receiving second decryption control message (EMM's) which contain management information for entitling selected stream receiving devices to decrypt the encrypted content data from the data stream using control words from the first decryption control messages (ECM's);
   receiving further management information included in at least part of the first decryption control messages (ECM's) at random based upon a random generator, contained in at least one of source providers, for supplying said management information;
   extracting a control word from at least one of the first decryption control message (ECM) from the stream;
   together with said extracting, testing whether the at least one first decryption control message (ECM) contains further management information targeted at the stream receiving device; and
   indefinitely disabling subsequent decryption of at least part of the stream in the stream receiving device upon detection of said testing,
   wherein said further management information specifies a condition upon entitlement data, said testing comprising searching for entitlement data stored in said stream receiving device to detect whether any of the searched entitlement data meets said condition, and performing said disabling if such entitlement data with specified said condition of disabling is found.

2. A method according to claim 1, wherein the stream receiving device contains identification information that individually identifies the stream receiving device, first decryption control message (ECM) containing further identification information, said testing comprising comparing the identification information and the further identification information.

3. A method of generating an encrypted data stream, the method comprising:
   generating encrypted content data at a stream generating device, the decryption of which requires temporally changing control words;
   generating first decryption control messages (ECM's), which contain the control words, in the data stream;
   generating second decryption control messages (EMM's) which contain management information for entitling selected stream receiving devices to decrypt content data from the data stream using control words from the first decryption control messages (ECM);
   generating further management information in at least part of the first decryption control messages (ECM's) at random based upon a random generator, contained in at least one of source providers, for supplying said management information, the further management information being arranged to target selected stream receiving devices to indefinitely disable subsequent decryption of at least part of the stream in the stream receiving device; and including said encrypted content data, said first decryption control messages (ECM's), said first decryption control messages (EMM's) and said further management information in the data stream, wherein said further management information specifies a condition upon entitlement data, and searching for entitlement data stored in said selected stream receiving devices to detect whether any of the searched entitlement data meets said condition, and performing the disabling if such entitlement data with specified said condition of disabling is found.

4. A method according to claim 3, wherein the further management information targets the selected stream receiving devices with identification information corresponding to individual identification information of selected stream receiving devices.

5. A method according to claim 3, wherein the further management information targets the selected stream receiving devices with information that specifies a condition upon a content of entitlement data in said stream receiving devices.

6. A stream receiving device for providing conditional access to an encrypted data stream, wherein the data stream comprises encrypted content data, the decryption of which requires temporally changing control words, the data stream further comprising first decryption control messages (ECM's), which each contain a control word, and second decryption control messages (EMM's) which contain management information for entitling the stream receiving device to decrypt content data from the data stream using control words from the first decryption control messages (ECM's), the stream receiving device comprising:

a processor and a circuit configured to perform the functions of:

extracting a control word from a first decryption message from the stream, and, together with said extracting, to test whether the first decryption control messages (ECM's) contain further management information targeted at the stream receiving device, the stream receiving device indefinitely disabling subsequent decryption of at least part of the stream upon said detection of said testing, wherein said further management information is included in at least part of the first decryption control messages (ECM's) at random based upon a random generator, contained in at least one of source providers, for supplying said management information and specifies a condition upon entitlement data, said testing comprising searching for entitlement data stored in said stream receiving device to detect whether any of the searched entitlement data meets said condition, and performing said disabling if such entitlement data with specified said condition of disabling is found.

7. A stream receiving device according to claim 6, wherein said testing whether the further management information is targeted at the stream receiving device comprises comparing identification information from the further management information with an identification of the stream receiving device.

8. A stream receiving device according to claim 6, wherein said testing whether the further management information is targeted at the stream receiving device comprises searching for entitlement data stored in said stream receiving device that meets a condition specified in the further management information.

9. A smart card for use in a stream receiving device according to claim 7, the smart card comprising a processor and an entitlement memory, the processor being programmed to:

extract a control word from a first decryption control message (ECM) from the stream and to supply the control word for use in decrypting content data;

update the entitlement memory using information from a second decryption control message (EMM);

together with said extracting, test whether the first decryption control message (ECM) contains further management information targeted at the stream receiving device, wherein the further management information is included in the first decryption control messages (ECM's) at random based upon a random generator, contained in at least one of source providers, for supplying said management information, and indefinitely disable subsequent supply of control words of at least part of the stream upon said detection.

10. A stream generating device for generating an encrypted data stream, the stream generating device comprising:

a processor and a circuit configured to:

generate a source of content data, comprising an encryption unit for encrypting the content data so that temporally changing control words are required;

generate a source of first decryption control messages, that generates first control word messages in the stream containing control words for decrypting the content data; and generate a source of access management information, that generates first control word messages in the stream containing management information for entitling selected stream receiving devices to decrypt content data, the source of access management information being coupled to the source of first decryption control messages, the source of first decryption control messages being arranged to include further management information in at least part of the first decryption control messages at random based upon a random generator, contained in at least one of source providers, for supplying said management information, the further management information being arranged to target selected stream receiving devices to indefinitely disable subsequent decryption of at least part of the stream in the stream receiving device, wherein said further management information specifies a condition upon entitlement data and searching for entitlement data stored in said selected stream receiving devices to detect whether any of the searched entitlement data meets said condition, and performing the disabling if such entitlement data with specified said condition of disabling is found.

* * * * *